United States Patent
Hammam et al.

(10) Patent No.: US 9,935,880 B2
(45) Date of Patent: *Apr. 3, 2018

(54) SYSTEMS AND METHODS FOR SCALABLE AND RESILIENT LOAD BALANCING

(75) Inventors: Tarik Hammam, Kista (SE); Fredrick Beste, Uppsala (SE); Anders Franzen, Trångsund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 205 days.

This patent is subject to a terminal disclaimer.

(21) Appl. No.: 14/370,289

(22) PCT Filed: Jan. 12, 2012

(86) PCT No.: PCT/IB2012/050164
§ 371 (c)(1),
(2), (4) Date: Jul. 2, 2014

(87) PCT Pub. No.: WO2013/104956
PCT Pub. Date: Jul. 18, 2013

(65) Prior Publication Data
US 2014/0347993 A1 Nov. 27, 2014

(51) Int. Cl.
 H04L 12/803 (2013.01)
 H04L 29/08 (2006.01)
 H04L 29/14 (2006.01)
(52) U.S. Cl.
 CPC ............ *H04L 47/125* (2013.01); *H04L 67/10* (2013.01); *H04L 67/288* (2013.01); *H04L 69/40* (2013.01)
(58) Field of Classification Search
 CPC .............................. H04L 47/125; H04L 67/10
 See application file for complete search history.

(56) References Cited

U.S. PATENT DOCUMENTS

| 5,774,660 A | 6/1998 | Brendel et al. |
| 6,731,598 B1 | 5/2004 | Béliveau et al. |

(Continued)

FOREIGN PATENT DOCUMENTS

WO 2007071607 A1 6/2007

OTHER PUBLICATIONS

International Search Report filed in U.S. Appl. No. 13/703,407, dated Apr. 26, 2011 in International Application No. PCT/IB2010/053207, 3 pages.

(Continued)

*Primary Examiner* — Un C Cho
*Assistant Examiner* — Jeremy Costin
(74) *Attorney, Agent, or Firm* — Rothwell, Figg, Ernst & Manbeck, P.C.

(57) ABSTRACT

A method for providing resilient load balancing in a system comprising a first processing unit, a second processing unit, a first active load balancer and a second active load balancer is disclosed. A first set of packet flows may be mapped to the first active load balancer and a second set of packet flows may be mapped to the second active load balancer. The first set of packet flows may include a first packet flow. In some embodiments, the method includes: (a) storing, by the first processing unit, a set of state information associated with the first active load balancer, the set of state information comprising state information associated with a first session associated with the first packet flow; (b) receiving, by the first processing unit, information indicating that the first active load balancer is inoperable; and (c) in response to receiving the information indicating that the first active load balancer is inoperable, transmitting, from the first processing unit to the second active load balancer, the state information associated with the first session.

24 Claims, 7 Drawing Sheets

(56) References Cited

U.S. PATENT DOCUMENTS

| | | |
|---|---|---|
| 7,139,926 B1 | 11/2006 | Madhav et al. |
| 7,512,702 B1 | 3/2009 | Srivastava et al. |
| 8,788,640 B1 * | 7/2014 | Masters ................ H04L 45/123 370/232 |
| 2002/0073211 A1 * | 6/2002 | Lin ......................... H04L 63/10 709/229 |
| 2002/0138551 A1 * | 9/2002 | Erickson ................. H04L 29/06 709/203 |
| 2005/0286517 A1 | 12/2005 | Babbar et al. |
| 2006/0248213 A1 | 11/2006 | Sherer et al. |
| 2007/0174660 A1 * | 7/2007 | Peddada ............. H04L 41/0663 714/4.1 |
| 2007/0220302 A1 | 9/2007 | Cline et al. |
| 2010/0246517 A1 | 9/2010 | Pradas et al. |
| 2012/0011504 A1 | 1/2012 | Ahmad et al. |

OTHER PUBLICATIONS

Non-Final Office Action issued in U.S. Appl. No. 13/703,407, dated Jan. 14, 2015, 13 pages.

Final Office Action issued in U.S. Appl. No. 13/703,407, dated Aug. 12, 2015, 15 pages.

Decision on Appeal issued in U.S. Appl. No. 13/703,407, dated Jun. 1, 2017, 18 pages.

* cited by examiner

SYSTEMS AND METHODS FOR SCALABLE AND RESILIENT LOAD BALANCING

CROSS REFERENCE TO RELATED APPLICATION(S)

This application is a 35 U.S.C. § 371 National Phase Entry Application from PCT/IB2012/050164 filed Jan. 12, 2012, the disclosure of which is incorporated by reference.

TECHNICAL FIELD

This disclosure relates to the field of load balancing.

BACKGROUND

A load balancer (LB) is device (hardware and/or software) for balancing load across a set of two or more entities (e.g., processing units). In some environments, a load balancer balances session traffic across a set of applications (e.g., server applications), each of which runs on a processing unit (e.g., a server computer, a blade server, etc.). In such environments, the load balancer may be referred to as a "server load balancer" (SLB). In many applications, for resiliency purposes, it is desired to have in-place a stand-by LB in case an active LB (i.e., a currently functioning LB) fails. It is known that the stand-by LB can either be a "hot" stand-by or a "cold" stand-by.

When using a hot stand-by SLB it is required that connection data (e.g., a connection table) that is used by the active SLB in balancing session traffic across the server applications be replicated to the hot stand-by SLB prior to the failure of the active SLB. Typically, this replication is accomplished by updating connection data accessible to the hot stand-by SLB each time the connection data maintained by the active SLB is updated. An advantage of using a hot stand-by SLB is that, in case a failure of an active SLB occurs, a switchover to the stand-by SLB occurs and this stand-by SLB would have connection data that is identical to the connection data that was maintained by the active SLB, thereby enabling the stand-by SLB to takeover as active SLB and continue balance traffic for the already established sessions as well as new session.

A problem with using the hot stand-by method is that if both the active SLB and the hot stand-by SLB fail, then the connection data will be lost. Moreover, the hot stand-by method requires that the hot stand-by SLB work in tandem with the active SLB so that the active SLB's connection data can be replicated. Another problem with the hot stand-by method occurs when some event (e.g., power failure, operating system crash, hardware fault) causes the active SLB and a target processing unit (e.g., a processing unit on which a server application runs) to fail at more less the same time. When such a situation arises, the replicated connection data that is used by the stand-by SLB may include invalid information (e.g., information mapping a session to the failed target processing unit). This could cause the hot stand-by SLB to forward traffic to the failed target processing unit, which is undesirable because the traffic will not get processed due to the failure of the target processing unit.

A problem with using a cold stand-by SLB is that there is no replication of the active SLB's connection data, and this means that the cold stand-by SLB can not route traffic corresponding to a session that was established before the active SLB failed.

Additionally, to provide scalability, more than one active SLB may be used. That is, for example, a load balancing system may include a two or more active SLBs and may be configured so that additional active SLBs may be added easily to the load balancing system as the need arises.

SUMMARY

A load balancing system that is both scalable and resilient is disclosed. The load balancing system may be used to, among other things, implement a system of SLBs.

In one particular aspect, a method for providing resilient load balancing in a system comprising a first processing unit, a second processing unit, a first active load balancer and a second active load balancer is disclosed. A first set of packet flows may be mapped to the first active load balancer and a second set of packet flows may be mapped to the second active load balancer. The first set of packet flows may include a first packet flow. In some embodiments, the method includes: (a) storing, by the first processing unit, a set of state information associated with the first active load balancer, the set of state information comprising state information associated with a first session associated with the first packet flow; (b) receiving, by the first processing unit, information indicating that the first active load balancer is inoperable; and (c) in response to receiving the information indicating that the first active load balancer is inoperable, transmitting, from the first processing unit to the second active load balancer, the state information associated with the first session.

In some embodiments, the system further comprises a third active load balancer, the first set of packet flows also includes a second packet flow, and the set of state information also includes state information associated with a second session associated with the second packet flow. In such embodiments, the method may further include transmitting, from the first processing unit to the third active load balancer, state information associated with the second session in response to receiving the information indicating that the first active load balancer is inoperable. The state information associated with the session associated with the first packet flow may include a session identifier. The state information associated with the session associated with the first packet flow may also include a pair of TCP sequence numbers for use in splicing together two separate TCP connections, a sticky connection time value, and/or other auxiliary state information.

In some embodiments, the method further comprises receiving, at the first processing unit, a connection data update message transmitted from the first active load balancer, where the connection update message comprises the session identifier. In such embodiments, the storing step may be performed in response to receiving the connection update message.

In some embodiments, the system further comprises a load balancer monitor that monitors, at the least, the first active load balancer. In such embodiments, the method may also include: detecting, by the load balance monitor, that the first active load balancer is inoperable, and remapping the first packet flow to the second active load balancer and remapping the second packet flow to the third load balancer as a result of the load balance monitor detecting that the first active load balancer is inoperable.

In some embodiments, the method also includes: (i) transmitting, from the first active load balancer to the second processing unit, state information associated with a third session associated with the first packet flow; (ii) transmitting, from the first active load balancer to the second processing unit, state information associated with a fourth session associated with the second packet flow; (iii) transmitting, from the second processing unit to the second active load balancer, the state information associated with the third session; and (iv) transmitting, from the second processing unit to the third active load balancer, the state information associated with the fourth session. Steps (iii) and (iv) may be performed in response to receiving a message transmitted by the load balancer monitor comprising information indicating that the first active load balancer is inoperable.

In some embodiments, the method also includes mapping the first set of packet flows to the first active load balancer, wherein the mapping the first set of packet flows to the first active load balancer comprises: mapping the first packet flow to a first packet flow class, mapping the second packet flow to a second packet flow class, mapping the first packet flow class to the first active load balancer, and mapping the second packet flow class to the first active load balancer; and remapping the first packet flow class to the second active load balancer and remapping the second packet flow class to the third load balancer in response to a determination that the first active load balancer is inoperable.

In some embodiments, the method also includes: generating, by the first processing unit, a packet corresponding to a particular packet flow; determining the packet flow to which the generated packet corresponds; sending the packet to the second active load balancer in response to determining that the generated packet corresponds to the first packet flow; and sending the packet to the third load balancer in response to determining that the generated packet corresponds to the second packet flow.

In another aspect, there is provided a processing unit that includes a replication agent. The replication agent is operable to: (a) communicate with a first active load balance and a second active load balancer; (b) store a set of state information associated with the first active load balancer, the set of state information comprising state information associated with a first session associated with a first packet flow; and (c) in response to receiving information indicating that the first active load balancer is inoperable, transmit to the second active load balancer the state information associated with the first session. The state information associated with the first session may include a session identifier. Additionally, the state information associated with the first session may also include auxiliary state information, such as, for example, a pair of TCP sequence numbers for use in splicing together two separate TCP connections, a sticky connection time value, and/or other auxiliary state information.

In some embodiments, the replication agent is configured to store the state information in response to receiving a connection update message transmitted from the first active load balancer.

In some embodiments, the replication agent is further operable to communicate with a third active load balance, the set of state information further comprises state information associated with a session associated with a second packet flow, and the replication agent is further operable to transmit to the third load balancer state information associated with the session associated with the second packet flow in response to receiving the information indicating that the first load balancer is inoperable.

In some embodiments, the processing unit is operable to map the first set of packet flows to the first load balancer by. The processing unit may accomplish this by mapping the first packet flow to a first packet flow class, mapping the second packet flow to a second packet flow class, mapping the first packet flow class to the first load balancer, and mapping the second packet flow class to the first load balancer. In such an embodiment, the processing unit may be further operable to remap the first packet flow class to the second load balancer and remap the second packet flow class to the third load balancer in response to a determination that the first load balancer is inoperable.

In some embodiments, the processing unit is operable to: generate a packet corresponding to a particular packet flow; determine the packet flow to which the generated packet corresponds; send the packet to the second load balancer in response to determining that the generated packet corresponds to the first packet flow; and send the packet to the third load balancer in response to determining that the generated packet corresponds to the second packet flow.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
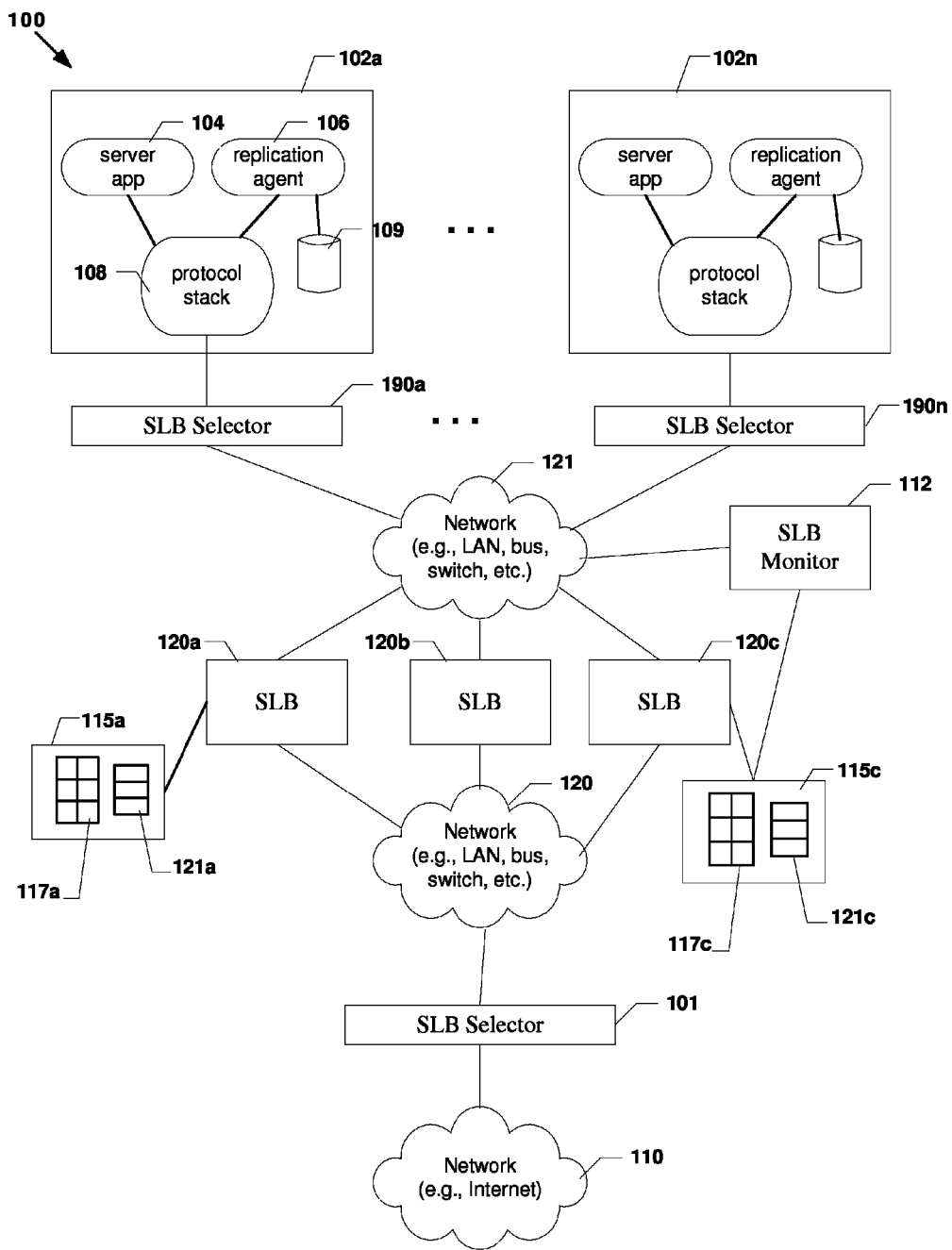
FIG. 1 illustrates a system according to an embodiment of the invention.

Referring now to FIG. 1, FIG. 1 illustrates a system 100 according to an embodiment of the invention. System 100 includes a set of active load balancers 120. For the sake of simplicity and brevity, we shall assume that each active load balancer 120 is an SLB, but this is not a requirement.

In the example shown, system 100 includes SLB 120a, SLB 120b, and SLB 120c. Each active SLB 120 is operable to balance session traffic across, among other things, a set of server applications ("apps") 104, each of which runs on a processing unit 102. Also running on each processing unit 102a to 102n, is a replication agent 106. System 100 also includes an SLB selector 101 located between a network 110 (e.g., the Internet or other network) and the SLBs 120 and further includes SLB selectors 190a to 190n. SLB selector 101 functions to load balance the SLBs.

Figure 2:
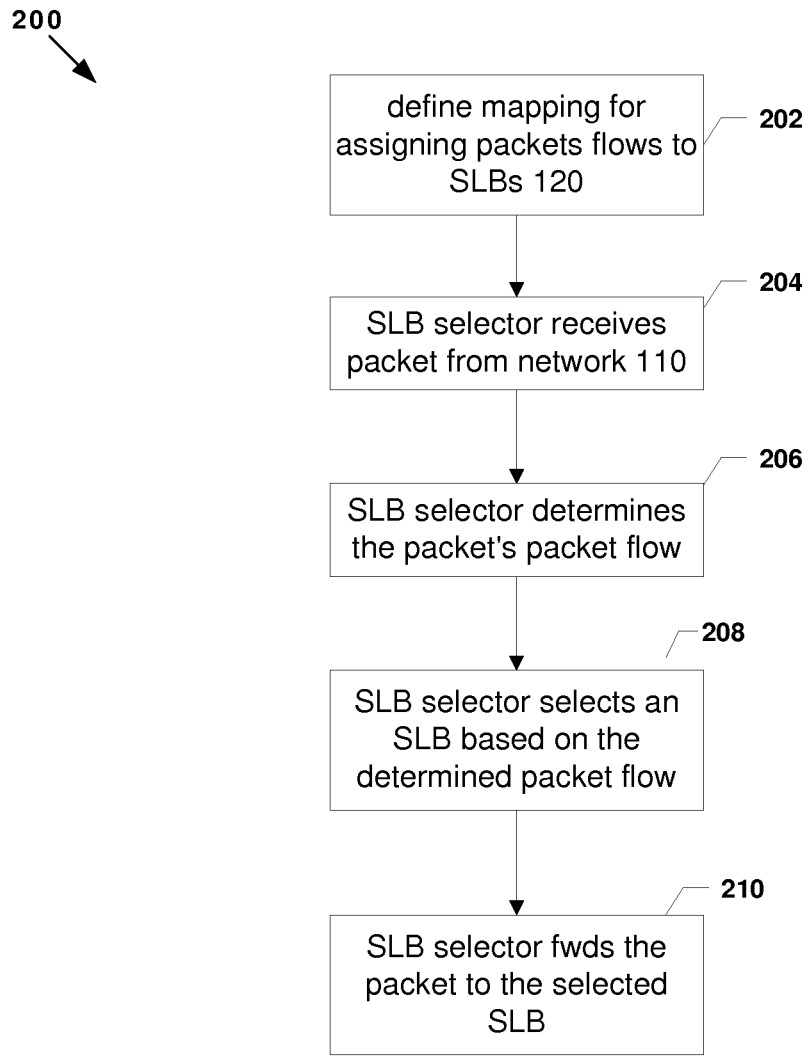
FIG. 2 is a flow chart illustrating a processes according an embodiment of the invention.

FIG. 2 is a flow chart illustrating a process 200, according to some embodiments. Process 200 may begin in step 202 where a mapping is defined for assigning packet flows to the SLBs 120. In some embodiments, the packet flows are assigned to the SLBs by first mapping the packet flows into classes and then mapping each class to one of the SLBs 120. For example, a packet flow may be any characteristic of a packet, such as the source network address (e.g., an IP address) and destination network address of the packet. Thus, a packet flow may simply be a source/destination IP address pair. As another example, a packet flow may consist of a 4-tuple consisting of a source/destination IP address pair and a source/destination port number (e.g., TCP port number). Each packet flow may be assigned to an SLB by first creating a mapping that maps each packet flow to one of a predefined set of distribution equivalence classes (DECs) and then assigning each predefined DEC to one of the SLBs. Preferably, a predefined DEC will be mapped to one and only one SLB. In some embodiments, there may exist N number of DECs, where N>1. For example, N may equal 99. One way to map a packet flow to a DEC is to first determine the packet flow (e.g., the source/destination address pair), then use the packet flow to create an intermediate value (I) (e.g., xor the source address with the destination address to produce the I value—i.e., I=Source XOR destination), and then obtain a DEC value (D) by moding I by N (i.e., D=I mod N). The obtained DEC value D uniquely identifies one of the predetermined N DECs. In this manner, each packet flow can be mapped to one of the N DECs and a table or other data structure can be used to map each of the N DECs to one of the SLBs 120.

In step 204, SLB selector 101 receives a packet (e.g., an IP packet) transmitted from a device (e.g., a router) from network 110.

In step 206, selector 101 determines the packet's packet flow (e.g., determines the source/destination network addresses stored in the header of the IP packet).

In step 208, selector 101 selects one of the SLBs 120 based on the packet's packet flow. For example, in step 208, selector 101 may (i) XOR the source network address with the destination network address obtained from the header of the IP packet to produce intermediate value I (i.e., I=source XOR destination), then (ii) compute D=I mod N, where N=3, and then (iii) use the calculated value of D to select the SLB 120 that is mapped to the DEC value of D (e.g., use D and a look-up table that maps each SLB 120 to a value of 0, 1 or 2).

In step 210, selector 101 forwards the received packet to the selected SLB.

Figure 3:
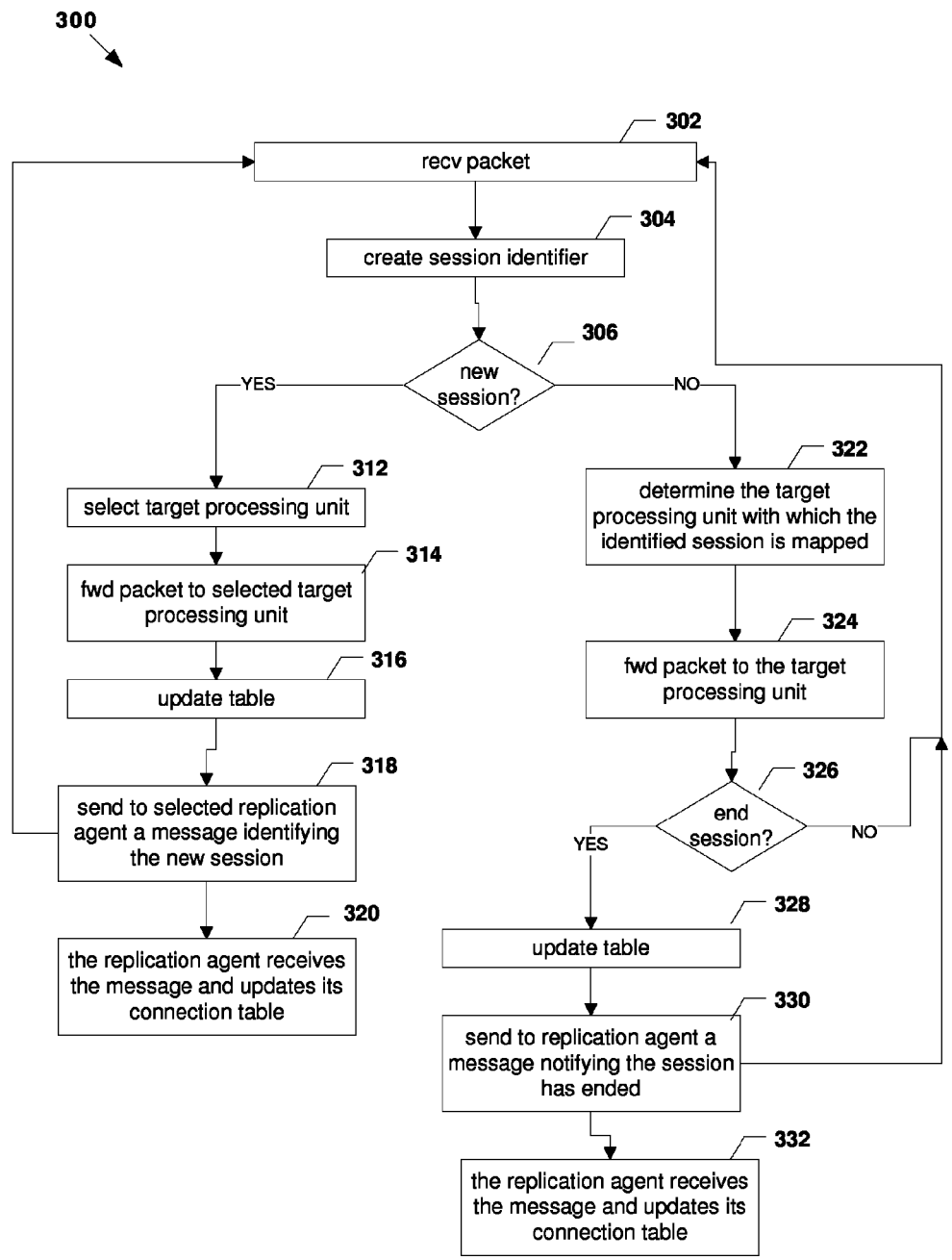
FIG. 3 is a flow chart illustrating a processes according an embodiment of the invention.

FIG. 3 is a flow chart illustrating a process 300, according to some embodiments, that is performed by an SLB 120 (e.g., SLB 120a). Process 300 may begin in step 302, where SLB 120a receives session traffic (e.g., a packet) from selector 101. For the sake of simplicity, we shall assume that in step 302 SLB 120a received an IP packet.

In step 304, SLB 120a extracts data from the received packet to generate a session identifier (e.g., a data structure, such as a string of bits or other structure, containing data from certain fields of the packet that together identify a session). For example, in step 304, assuming the IP packet encapsulates a Transmission Control Protocol (TCP) packet or a User Datagram Protocol (UDP) packet, SLB 120a may generate a session identifier containing: (a) one or more of the following items from the IP header of the packet: source address, destination address, version (e.g. IPv4 or IPv6), and protocol (e.g., TCP or UDP) and (b) one or more of the following items from the TCP/UDP header: source port and destination port.

In step 306, SLB 120a determines whether the packet corresponds to a new session. In the case where the packet is a TCP/IP packet, in some embodiments, SLB 120a determines whether the packet corresponds to a new session by determining if the packet contains a TCP packet that indicates that the TCP packet is a TCP connection request (i.e., the SYN bit of the TCP packet is set).

In the case where the packet is a UDP/IP packet, in some embodiments, SLB 120a determines whether the packet corresponds to a new session by determining whether the generated session identifier matches a session identifier stored in a connection table 117a stored in storage unit 115a, which may be a volatile (e.g., RAM) or non-volatile storage unit. In some embodiments, connection table 117a stores connection data that includes information mapping sessions to target processing units 102. For example, the connection data may include a plurality of records, where each record comprises a first field for storing a session identifier identifying a session and a second field for storing a processing unit identifier (e.g., an IP address) associated with a target processing unit 102. In some embodiments, the records may include additional fields.

If the traffic corresponds to a new session, then the process proceeds to step 312, otherwise it proceeds to step 322.

In step 312, SLB 120a selects a target processing unit 102. For example, a table 121a of targeting processing unit identifiers may be stored in storage unit 115a, and SLB 120a selects a target processing unit in step 312 by, for example, randomly selecting from the table 121a an identifier that identifies a target processing unit.

In step 314, SLB 120a may forward the packet received in step 302 to the selected target processing unit 102. The packet is then received and processed by protocol stack 108 and, if the packet contains application data, then the application data contained in the packet is provided to server application 104. In other embodiments, SLB 120a may not forward the packet, but rather may transmit an acknowledgement to the sender of the TCP connection request and may transmit a new TCP connection request to the selected processing unit. In such an embodiment, SLB 120a may store auxiliary state information (e.g., sequence number mapping information) to allow SLB 120a to splice the incoming TCP connection (i.e., the TCP connection established between the device in network 110 and SLB 120a) with the outgoing TCP connection (i.e., the TCP connection established between SLB 120a and the selected processing unit 102). For example, the auxiliary state information may comprise a pair of TCP sequence numbers that define a mapping between a first sequence number space associated with the incoming TCP connection and a second sequence number space associated with the outgoing TCP connection.

In step 316, SLB 120a updates connection table 117a. For example, in step 316, SLB 120a may add a record to table 117a, which record contains in one field the session identifier generated in step 304 and in another field a target processing unit identifier that identifies the target processing unit selected in step 312. The record may contain one or more other fields for storing auxiliary state information. For example, the record may contain a field for storing a time value representing the time at which the packet was received by SLB 120a (or other auxiliary state information). This time value may be used to implement sticky TCP connections and may be referred to as a sticky connection time value.

Advantageously, in some embodiments, in step 318, SLB 120a sends to the selected target processing unit a connection data update message that includes the generated session identifier. The connection data update message may also include auxiliary state information, such as, for example, a sticky connection time value associated with the session identifier, a pair of TCP sequence numbers for use in splicing together the above mentioned incoming and outgoing TCP connections, and/or other auxiliary state information. This message is received by a protocol stack 108 running on the target processing unit 102 and the message is then provided to the replication agent 106 running on the target processing unit 102.

Replication agent 106, in response to receiving the connection data update message, stores in storage unit 109 information included in the connection update message (step 320) (e.g., the session identifier and any other state information included in the message as described above). Accordingly, a portion of connection table 117a is duplicated in storage unit 109. This provides the distinct advantage of enabling replication agent 106 to another SLB 120 of the active sessions that were handled by SLB 120a, as well as the target processing units associated with those active sessions, in the event SLB 120a experiences a failure or is taken off-line or otherwise becomes inoperable. This information regarding the active sessions enables another active SLB 120 (e.g. SLB 120b) to take over the handling of these active sessions.

While replication agent 106 is shown as being separate and apart from protocol stack 108 (i.e., replication agent 106 is a user application), this was done solely for the sake of illustration. In some other embodiments, replication agent 106 may be part of protocol stack 108 or some other part of the operating system. In the case where, replication agent 106 is a part of protocol stack 108, step 318 may be unnecessary because (a) the replication agent 106 may obtain from the protocol stack 108 a copy of the packet (or a copy of some portion of the packet) that was forwarded in step 314 and (b) replication agent 106 can be configured to use this information to generate the session identifier in the same manner that SLB 120 generates the session identifier as described above. After replication agent 106 generates the session identifier, agent 106 can store it in storage unit 109.

In step 322, SLB 120a determines the target processing unit that is associated with the generated session identifier. SLB 120a, in some embodiments, makes this determination by selecting the record in connection table 117a that includes a session identifier that matches the session identifier generated in step 304. This selected record will contain a target processing unit identifier that identifies the target processing unit associated with the generated session identifier.

In step 324, SLB 120a forwards the packet received in step 302 to the determined target processing unit 102 (or, in the case of TCP splicing, forwards a modified copy of the packet received in step 302). In step 326, SLB 120a determines whether the packet indicates the end of the session. For example, in the case where the packet is a TCP/IP packet, SLB 120a determines that the packet indicates the end of the session when the FIN bit of the TCP packet is set. If the packet does not indicate the end of the session, the process may proceed back to step 302, where SLB 120a receives a new packet. If the packet indicates the end of the session, then SLB 120a updates its connection table by removing the record in the table that contains a session identifier that matches the session identifier generated in step 304 (step 328).

In step 330, SLB 120a sends to the replication agent on the determined target processing unit a connection data update message that includes the generated session identifier (the message may also include an end-of-session indication). In response to receiving this message, the replication agent 106 removes from storage unit 109 the session identifier that matches the session identifier included in the message (step 332).

Figure 4:
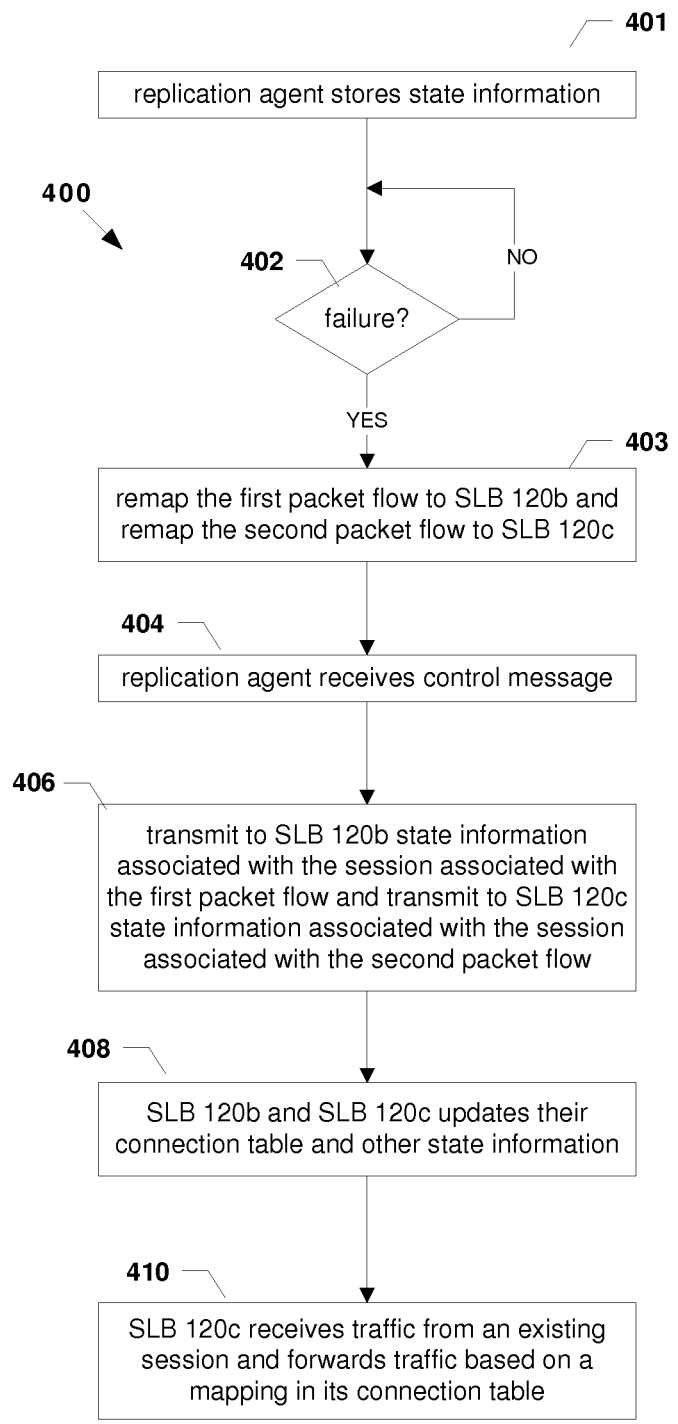
FIG. 4 is a flow chart illustrating a processes according an embodiment of the invention.

Referring now to FIG. 4, FIG. 4 is a flow chart illustrating a process 400, according to some embodiments, that is performed, at least in part, by replication agent 106. Process 400 assumes that a first packet flow and a second packet flow are currently mapped to SLB 120a.

Figure 6:
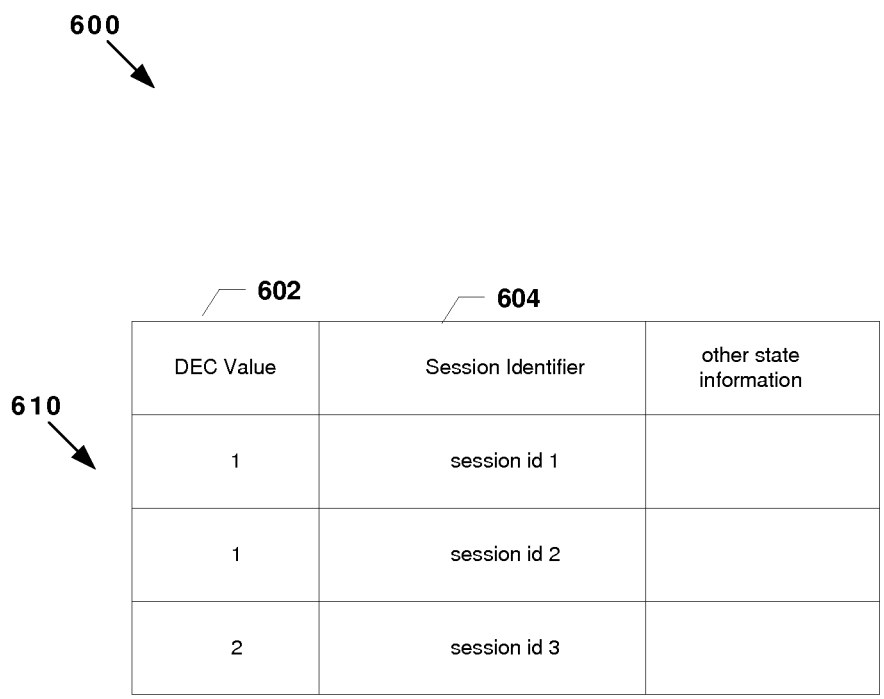
FIG. 6 illustrates an exemplary database table for storing state information.

Process 400 may begin in step 401, where, as described above, replication agent 106 stores state information pertaining to a session corresponding to the first packet flow and stores state information pertaining to a session corresponding to the second packet flow. This information may be stored in storage unit 109. The state information may include a session identifier as well as other state information (e.g., sticky connection time value and/or a pair of TCP sequence number information needed to splice together two TCP connections). FIG. 6 illustrates an exemplary table 600 that may be used by replication agent to store the state information. As shown in FIG. 6, table 600 may include a set of records 610 and each record 610 includes a first field 602 for storing a DEC value and a second field 604 for storing a session identifier. Each record may also includes other fields for storing other state information. The DEC value stored in a record 610 may be computed, as described above, from information from the session identifier stored in the record.

In step 402, an SLB monitor 112 determines whether SLB 120a has experienced a failure (or is otherwise inoperable). If SLB 120a has not experienced a failure, SLB monitor 112 continues monitoring SLB 120a. In the event of a failure, process 400 proceeds to step 403.

In step 403, SLB monitor 112 (or other device), for each packet flow currently mapped to SLB 120a, remaps the packet flow to another of the active SLBs (e.g., SLB 120b,c). In this example we will assume the first packet flow is remapped to SLB 120b and the second packet flow is remapped to SLB 120c. For instance, if we assume the first packet flow was initially been mapped to a DEC value of 1, the second packet flow was initially been mapped to a DEC value of 2, and DEC values 1 and 2 were initially assigned to SLB 120a, then, in step 403, SLB monitor 112 can remap the first and second packet flows to SLB 120b and SLB 120c, respectively, by reassigning DEC value 1 to SLB 120b and reassigning DEC value 2 to SLB 120c.

After SLB monitor 112 remaps the packet flows that were initially mapped to SLB 120a, SLB monitor transmits a control message (a.k.a., a connection data synchronization message). In some embodiments, the control message may be broadcast so that it is received by each processing unit 102a to 102n (or each target processing unit identified in tables 121a and 121c) so that the message can be processed by the replication agents 106. In other embodiments, a separate control message is unicast to each processing unit 102 and each control message may be addressed to the replication agent 106 running on the target processing unit to which the control message was sent, thus, the control message is provided to the replication agent. The control message may be sent by SLB monitor 112 in response to it determining that SLB 120a has failed. While SLB monitor 112 is shown as being separate and apart from each SLB 120 and processing unit 102, this is not a requirement as monitor 112 may be a module of an SLB 120 and/or processing unit 102.

The control message(s) transmitted by monitor 112 may include information indicating that the SLB 120a is inoperable. Additionally, the control message(s) may further include information identifying the remapping of the packet flows. For instance, if monitor 112 has reassigned DEC value 1 from SLB 120a to SLB 120b and has reassigned DEC value 2 from SLB 120a to SLB 120c, then the control message may include information identifying these DEC value reassignments so that the replication agent will have knowledge regarding which SLB is handing which packet flows.

In step 404, the control message is received by processing unit 102a.

In response to receiving the control message, the replication agent 106 determines (i) which of the packet flows that were initially mapped to SLB 120a have been assigned to SLB 120b and (ii) which of the packet flows that were initially mapped to SLB 120a have been assigned to SLB 120c. For example, replication agent 106 parses the control message to determine the DEC value(s) that have been reassigned from SLB 120a to SLB 120b and the DEC value(s) that have been reassigned from SLB 120a to SLB 120c. In this example, the first packet flow is mapped to DEC value 1 which has been reassigned to SLB 120b and the second packet flow is mapped to DEC value 2 which has been reassigned to SLB 120c.

Accordingly, in step 406, in response to receiving the control message, replication agent 106 transmits to SLB 120b state information (e.g., session identifier) associated with the session associated with the first packet flow and transmit to SLB 120c state information associated with the session associated with the second packet flow.

For example, in step 406, replication agent 106 may transmit to SLB 120b a replication message comprising the set of session identifiers and other state information associated in table 600 with DEC value 1 and may transmit to SLB 120c a replication message comprising the set of session identifiers and other state information associated in table 600 with DEC value 2.

Replication agent 106 may obtain the network address of SLBs 120b,c from a configuration file stored in storage unit 109 or it may be included in the control message.

In step 408, SLBs 120b and 120c update their connection tables based on the information transmitted in step 406. For example, SLB 120c uses the session identifiers it receives from each replication agent to update connection table 117c, which is a replication of at least part of connection table 117a and which is stored in storage unit 115c. Thus, connection table 117c contains replicated connection data. For example, for each session identifier that SLB 120c receives from a particular replication agent 106, SLB 120c may add to table 117c a record comprising a first field that stores the session identifier and a second field that stores a target processing unit identifier that identifies the target processing unit on which the replication agent is running, thereby storing information that maps the session identified by the session identifier with the target processing unit identified by the target processing unit identifier. This target processing unit identifier may be included in the replication message sent by the replication agent in step 406. SLB 120b performs similar operations.

In step 410, SLB 120c receives session traffic (e.g., a packet) from selector 101 and uses the information mapping sessions to target processing units (e.g., connection table 117c) to forward the packet to the appropriate target processing unit as described above in connection with FIG. 3.

Figure 7:
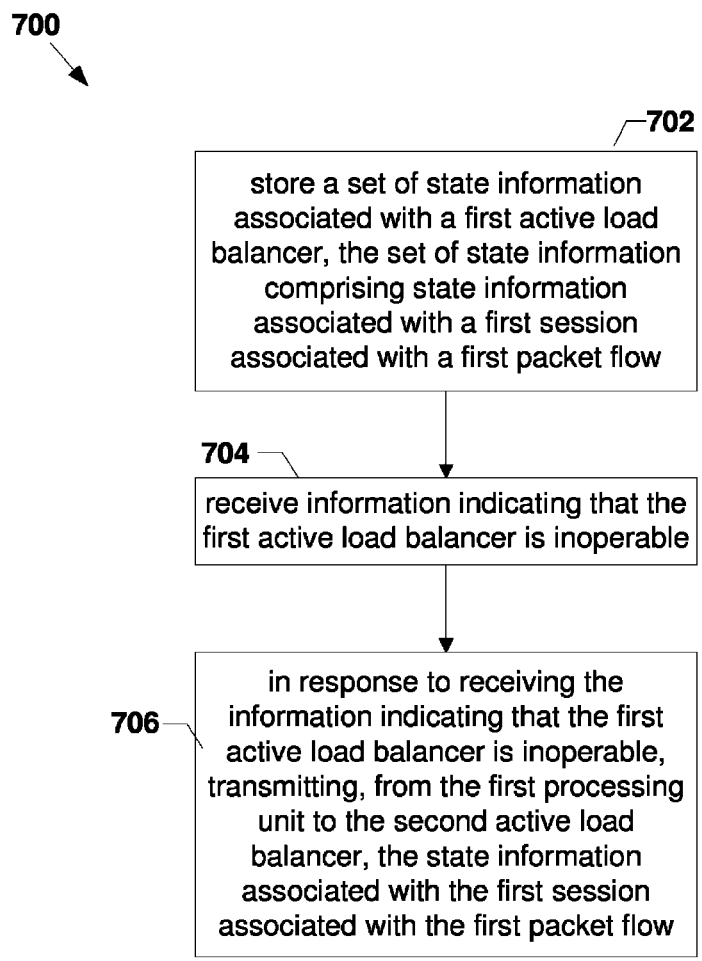
FIG. 7 is a flow chart illustrating a processes according an embodiment of the invention.

FIG. 7 is a flow chart illustrating a process 700, according to another embodiment, for providing resilient load balancing in a system comprising a first processing unit, a second processing unit, a first active load balancer and a second active load balancer, wherein a first set of packet flows is mapped to the first active load balancer, and a second set of packet flows is mapped to the second active load balancer, the first set of packet flows comprising a first packet flow. Process 700 may begin in step 702, where the first processing unit stores a set of state information associated with the first active load balancer, the set of state information comprising state information associated with a first session associated with the first packet flow. In step 704, the first processing unit receives information indicating that the first active load balancer is inoperable. In step 706, in response to receiving the information indicating that the first active load balancer is inoperable, the first processing unit transmits to the second active load balancer the state information associated with the first session associated with the first packet flow.

Referring back to FIG. 1, while active SLB 120a is shown as being separate and apart from the target processing units 102, this is not a requirement. SLB 120a, in fact, may run on one of the target processing units. Also, when a processing unit (e.g., processing unit 102a) transmits a packet towards network 110, the packet may be received by selector 190a. Selector 190a functions to route the packet to the appropriate SLB 120. To achieve this, in some embodiments, selector 190a maintains information identifying, for each SLB 120a-c, the packet flows that are mapped to the SLB. For example, each selector 190 may store a table that, for each SLB 120a-c, maps one or more unique DEC values to the SLB. Thus, when a selector 190 receives a packet the selector 190 can compute a DEC value from information contained in the packet (e.g., source/destination network address) and then use the computed DEC value and table to determine the SLB associated with the computed DEC value. The SLB associated with the computed DEC value is then the appropriate SLB to which the selector should forward the packet. While selectors 190 are shown as being separate and apart from the target processing units 102, this is not a requirement; in fact, each selector 190 may run on one of the target processing units. Furthermore, instead of having a selector 190 for each processing unit 102, it is possible to have a single selector 190 that is connected to each processing unit 102.

Figure 5:
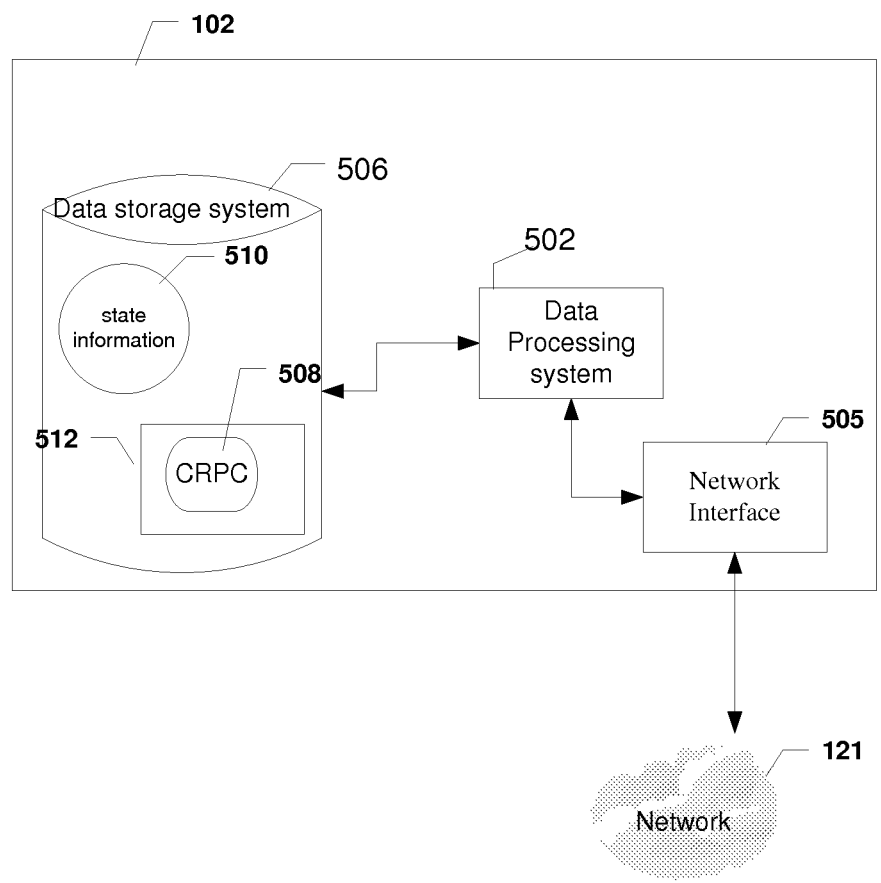
FIG. 5 is a functional block diagram of a processing unit according to some embodiments.

Referring now to FIG. 5, FIG. 5 illustrates a block diagram of a processing unit 102, according to some embodiments. As shown in FIG. 5, processing unit 102 may include: a data processing system 502, which may include one or more data processing devices each having one or more microprocessors and/or one or more circuits, such as an application specific integrated circuit (ASIC), Field-programmable gate arrays (FPGAs), etc; a network interface 505 for receiving and transmitting data (e.g., packets transmitted from SLBs 120 and messages transmitted from SLB monitor 112); a data storage system 506, which may include one or more computer-readable mediums, such as non-volatile storage devices and/or volatile storage devices (e.g., random access memory (RAM)). As shown, data storage system 506 may be used to store state information 510, which may include table 600.

In embodiments where data processing system 502 includes a microprocessor, a computer program product is provided, which computer program product includes: computer readable program code 508, which implements a computer program, stored on a computer readable medium 512, such as, but not limited to, magnetic media (e.g., a hard disk), optical media (e.g., a DVD), memory devices (e.g., random access memory), etc. In some embodiments, computer readable program code 508 is configured such that, when executed by data processing system 502, code 508 causes the processing system 502 to perform steps described above (e.g., steps describe above with reference to the flow chart shown in FIG. 4).

In other embodiments, processing unit 102 may be configured to perform steps described above without the need for code 508. For example, data processing system 502 may consist merely of specialized hardware, such as one or more application-specific integrated circuits (ASICs). Hence, the features of the present invention described above may be implemented in hardware and/or software. For example, in some embodiments, the functional components of processing unit 102 described above may be implemented by data processing system 502 executing computer instructions 508, by data processing system 502 operating independent of any computer instructions 508, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing resilient load balancing in a system comprising a set of processing units comprising at least a first processing unit and a second processing unit, and a set of active load balancers comprising at least a first active load balancer and a second active load balancer, the method comprising the steps of:
    mapping to the first active load balancer a first set of packet flows comprising at least a first packet flow;
    the first active load balancer receiving a first packet associated with a first session;
    determining that the first session needs to be assigned to one of the processing units included in the set of processing units;
    in response to determining that the first session needs to be assigned to one of the processing units included in the set of processing units, the first active load balancer performing a load balancing step for balancing session traffic across the set of processing units, said load balancing step comprising the first active load balancer selecting from among the set of processing units a target processing unit for receiving packets belonging to the first session, the first processing unit being selected as the target processing unit;
    forwarding, by the first active load balancer, packets associated with the first session to the first processing unit;
    storing, by the first processing unit, a set of state information associated with the first active load balancer, the set of state information associated with the first active load balancer comprising state information associated with the first session, wherein the state information associated with the first session comprises a session identifier identifying the first session;
    the first processing unit receiving information indicating that the first active load balancer is inoperable;
    in response to receiving the information indicating that the first active load balancer is inoperable, the first processing unit transmitting to the second active load balancer the state information associated with the first session, wherein the second active load balancer is also configured to balance session traffic across said set of processing units.

2. The method of claim 1, wherein
the system further comprises a third active load balancer,
the first set of packet flows further comprises a second packet flow,
the set of state information further comprises state information associated with a second session associated with the second packet flow, and
the method further comprises transmitting, from the first processing unit to the third active load balancer, state information associated with the second session in response to receiving the information indicating that the first active load balancer is inoperable.

3. The method of claim 2, further comprising:
mapping the first set of packet flows to the first active load balancer, wherein the mapping the first set of packet flows to the first active load balancer comprises: mapping the first packet flow to a first packet flow class, mapping the second packet flow to a second packet flow class, mapping the first packet flow class to the first active load balancer, and mapping the second packet flow class to the first active load balancer; and
in response to a determination that the first active load balancer is inoperable: remapping the first packet flow class to the second active load balancer and remapping the second packet flow class to the third load balancer.

4. The method of claim 2, further comprising:
after performing step (c):
generating, by the first processing unit, a packet corresponding to a particular packet flow;
determining the packet flow to which the generated packet corresponds;
sending the packet to the second active load balancer in response to determining that the generated packet corresponds to the first packet flow; and
sending the packet to the third load balancer in response to determining that the generated packet corresponds to the second packet flow.

5. The method of claim 1, wherein
the system further comprises: a) a load balancer monitor that monitors the first active load balancer and b) a load balancer selector, and
the method further comprises the load balancer selector balancing session traffic across the set of active load balancers, the step of balancing session traffic across the set of active load balancers comprising:
    assigning a packet flow class value (PFCV) to the first active load balancer;
    receiving at the load balancer selector the first packet;
    the load balancer selector determining a PFCV associated with the first packet;
    the load balancer determining an active load balancer to which the determined PFCV has been assigned;
    as a result of the load balancer selector determining that the determined PFCV has been assigned to the first active load balancer, the load balancer selector forwarding the first packet to the first active load balancer.

6. The method of claim 1, further comprising:
processing, by a server application running on the first processing unit, application data contained in a packet associated with the first session.

7. The method of claim 1, wherein
the state information associated with the first session comprises a session identifier that comprises a network address obtained from a source field of a network layer header included in a network packet and a transport layer port number obtained from a source field of transport layer header included in the network packet, and the method further comprises:

the first active load balancer receiving a packet, the first active load balancer determining a session identifier based on address information included in the header of the packet, the first active load balancer selecting a processing unit based on the determined session identifier, and the first active load balancer forwarding at least a portion of the packet to the selected processing unit, wherein the selected processing unit is the first processing unit and the session identifier determined by the first active load balancer is the same as the session identifier included in the state information associated with the first session.

8. The method of claim 7, wherein the state information associated with the first session further comprises one or more of: a pair of TCP sequence numbers for use in splicing together two separate TCP connections and a sticky connection time value.

9. The method of claim 7, wherein the method further comprises, prior to step (a), receiving, at the first processing unit, a connection data update message transmitted from the first active load balancer, the connection update message comprises the session identifier, and the storing step is performed in response to receiving the connection update message.

10. The method of claim 1, further comprising:

prior to the first processing unit storing the state information associated with the first session, the first processing unit receiving from the first active load balancer a message comprising said session identifier;

the first processing unit, after receiving the message, determining a packet flow class value based on the session identifier; and the first processing unit storing the session identifier in association with the determined packet flow class value.

11. The method of claim 10, wherein receiving the information indicating that the first active load balancer is inoperable comprises the first processing unit receiving a message indicating that the packet flow class value as been reassigned to the second active load balancer.

12. The method of claim 1, wherein the system further comprises: a) a load balancer monitor that monitors the first active load balancer and b) a load balancer selector, and the method further comprises:

assigning a first packet flow class value (PFCV) to the first active load balancer, wherein each packet flow included in the first set of packets flows is associated with the first PFCV;

assigning a second PFCV to the second active load balancer, wherein each packet flow included in a second set of packet flows is associated with the second PFCV;

the load balancer selector receiving a packet;

the load balancer selector determining a PFCV based on address information included in a header of the received packet;

the load balancer selector determining an active load balancer to which the determined PFCV has been assigned;

as a result of the load balancer selector determining that the determined PFCV has been assigned to the first active load balancer, the load balancer selector forwarding the received packet to the first active load balancer;

the first active load balancer receiving the packet;

the first active load balancer determining a session identifier based on address information included in the header of the packet;

the first active load balancer selecting a processing unit based on the determined session identifier;

the first active load balancer forwarding at least a portion of the packet to the selected processing unit;

detecting, by the load balancer monitor, that the first active load balancer is inoperable; and as a result of detecting that the first active load balancer is inoperable: i) reassigning the first PFCV to the second active load balancer and ii) transmitting a message comprising a) an active load balancer identifier identifying the second active load balancer and b) information indicating that the first PFCV has been reassigned to the active load balancer identified by the active load balancer identifier.

13. The method of claim 12, further comprising:

the first processing unit mapping the state information associated with the first session with the first PFCV;

after mapping the state information associated with the first session with the first PFCV, the first processing unit receiving the information indicating that the first active load balancer is inoperable, said information being said message comprising the information indicating that the first PFCV has been reassigned to the second active load balancer; and as a result of receiving the message: i) the first processing unit retrieving all of the state information mapped to the first PFCV and ii) the first processing unit transmitting the retrieved state information to the active load balancer identified by the active load balancer identifier.

14. An apparatus, comprising:

a network interface;

a data storage system;

a data processing system coupled to the data storage system and coupled to the network interface; and a server application running on the data processing system;

wherein the data processing system is configured to cause the apparatus to:

process packets associated with a first session which in turn is associated with a first packet flow, said processing comprising providing application data contained in the packets to the server application;

store a set of state information associated with a first active load balancer, the set of state information comprising first state information associated with a first session associated with a first packet flow, wherein the first active load balancer is configured to balance session traffic across a set of processing units, the set of processing units comprising a first processing unit and a second processing unit; and in response to receiving information indicating that the first active load balancer is inoperable, transmit to a second active load balancer the first state information associated with the first session, wherein the second active load balancer is also configured to balance session traffic across said set of processing units.

15. The apparatus of claim 14, wherein
the set of state information associated with the first active load balancer further comprises second state information associated with a second session associated with a second packet flow, and
the apparatus is further configured to transmit to a third load balancer the second state information associated with the second session associated with the second packet flow in response to receiving the information indicating that the first load balancer is inoperable.

16. The apparatus of claim 15, wherein the first state information associated with the first session comprises a first session identifier that comprises a network address obtained from a source field of a network layer header included in a network packet and a transport layer port number obtained from a source field of transport layer header included in the network packet.

17. The apparatus of claim 16, wherein the first state information further comprises a pair of TCP sequence numbers for use in splicing together two separate TCP connections.

18. The apparatus of claim 15, wherein
the first packet flow maps to a first packet flow class value (PFCV) that was assigned to the first active load balancer;
the second packet flow maps to a second PFCV that was assigned to the first active load balancer;
the information indicating that the first active load balancer is inoperable comprises information indicating that the first PFCV has been reassigned to the second active load balancer and information indicating that the second PFCV has been reassigned to the third active load balancer.

19. The apparatus of claim 18, wherein the apparatus is configured to store the first state information such that the first state information is linked with the first PFCV.

20. The apparatus of claim 15, wherein:
the apparatus is operable to map the first set of packet flows to the first load balancer by: mapping the first packet flow to a first packet flow class, mapping the second packet flow to a second packet flow class, mapping the first packet flow class to the first load balancer, and mapping the second packet flow class to the first load balancer, and
the apparatus is further operable to remap the first packet flow class to the second load balancer and remap the second packet flow class to the third load balancer in response to a determination that the first load balancer is inoperable.

21. The apparatus of claim 15, wherein the apparatus is operable to:
generate a packet corresponding to a particular packet flow;
determine the packet flow to which the generated packet corresponds;
send the packet to the second load balancer in response to determining that the generated packet corresponds to the first packet flow; and
send the packet to the third load balancer in response to determining that the generated packet corresponds to the second packet flow.

22. The apparatus of claim 14, wherein the replication agent is configured to store the state information in response to receiving a connection update message transmitted from the first active load balancer.

23. The apparatus of claim 14, further comprising:
the first active load balancer and the second active load balancer, wherein the first active load balancer is configured to:
receive a first packet associated with a first session;
determine that the first session needs to be assigned to one of the processing units included in the set of processing units;
in response to determining that the first session needs to be assigned to one of the processing units included in the set of processing units, perform a load balancing step for balancing session traffic across the set of processing units, said load balancing step comprising selecting from among a set of processing units a target processing unit for receiving packets belonging to the first session; and
forward packets associated with the first session to the target processing unit.

24. The apparatus of claim 23, further comprising:
a load balancer selector, wherein the load balancer selector is configured to balance session traffic across a set of active load balancers, the set of active load balancers comprising the first active load balancer and the second active load balancer, the step of balancing session traffic across the set of active load balancers comprising:
assigning a packet flow class value (PFCV) to the first active load balancer;
receiving at the load balancer selector the first packet;
the load balancer selector determining a PFCV associated with the first packet;
the load balancer determining an active load balancer to which the determined PFCV has been assigned; and
as a result of the load balancer selector determining that the determined PFCV has been assigned to the first active load balancer, the load balancer selector forwarding the first packet to the first active load balancer.

* * * * *